US008335867B1

(12) United States Patent
Bar-Shalom

(10) Patent No.: US 8,335,867 B1
(45) Date of Patent: *Dec. 18, 2012

(54) METHOD AND APPARATUS FOR REDUCING HOST PROCESSOR ACTIVITY DURING INTERACTION WITH PERIPHERAL DEVICES

(75) Inventor: Ofer Bar-Shalom, Kiryat Ono (IL)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/193,100

(22) Filed: Jul. 28, 2011

Related U.S. Application Data

(63) Continuation of application No. 12/330,217, filed on Dec. 8, 2008, now Pat. No. 8,001,285.

(60) Provisional application No. 61/007,159, filed on Dec. 11, 2007.

(51) Int. Cl.
*G06F 3/00* (2006.01)

(52) U.S. Cl. .......................................................... 710/5

(58) Field of Classification Search ........................ None
See application file for complete search history.

(56) References Cited

U.S. PATENT DOCUMENTS

| 5,251,303 | A | 10/1993 | Fogg et al. |
| 5,809,334 | A | 9/1998 | Galdun et al. |
| 5,948,080 | A | 9/1999 | Baker |
| 6,092,116 | A | 7/2000 | Earnest et al. |
| 6,202,107 | B1 | 3/2001 | Collier |
| 7,546,506 | B2 * | 6/2009 | Sonoda et al. ................ 714/738 |
| 2004/0064606 | A1 | 4/2004 | Kimura |
| 2005/0033874 | A1 | 2/2005 | Futral et al. |
| 2006/0106949 | A1 | 5/2006 | Nicolson et al. |
| 2008/0148083 | A1 * | 6/2008 | Pesavento et al. ............ 713/322 |

OTHER PUBLICATIONS

ANSI/IEEE Std 802.11, 1999 Edition; Information technology—Telecommunications and information exhange between systems—Local and metropolitan area networks—Specific requirements-Part 11: Wireless LAN Medium Access Control (MAC) and Physical Layer (PHY) Specificaitons; LAN/MAN Standards Committee of the IEEE Computer Society; Aug. 20, 1999; 531 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systms—Local and metropolitan area networks—Specific requirements—Part 11: Wiress LAN Medium Access Control (MAC) and Physical Layer (PHY) specifications: Further Higher Data Rate Extension in the 2.4 GHz Band; LAN/MAN Standards Committee of the IEEE Computer Society; 69 pages.

(Continued)

*Primary Examiner* — Henry Tsai
*Assistant Examiner* — Juanito Borromeo

(57) ABSTRACT

A system including a processing core configured to generate a request signal to transfer data between a host device and a peripheral device. The processing core is in a low power state subsequent to generating the request signal. An interface module, separate from the processing core, is configured to transmit a sequence of commands from the host device to the peripheral device based on the request signal. The sequence of commands is transmitted to initiate the transfer of the data between the host device and the peripheral device. A comparator configured to compare expected responses of the peripheral device to the sequence of commands against responses received from the peripheral device to control the transfer of the data between the host device and the peripheral device without waking up the processing core from the low power state.

20 Claims, 11 Drawing Sheets

OTHER PUBLICATIONS

IEEE 802.11n; IEEE 802.11-04/0889r6; IEEE P802.11 Wiresless LANs; TGn Sync Proposal Technical Specification; Syed Aon Mujtaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11b-1999 (Supplement to IEEE Std 802.11-1999 Edition); Supplement to IEEE Standard for Information technology—Telecommunications and information exhcnage between systems—Local and metropolitan area networks—Specific requirements—Part 11: Wireless LAN Medium Access Control (MAC) and Physica Layer (PHY) specifications: High-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16-2004 (Revision of IEEE Std 802.16-2001) IEEE Standard for Local and metropolitan area networks; Part 16: Air Interface for Fixed Broadband Wireless Access Systems; IEEE Computer Society and the IEEE Microwave Theory and Techniques Society; Oct. 1, 2004; 893 pages.

IEEE Std 802.11h™-2003 [Amendment to IEEE Std 802.11™, 1999 Edition (Reaff 2003) as amended by IEEE Stds 802.11a™-1999, 802.11b™-1999, 802.11b™-1999/Cor 1-2001, 802.11d™-2001, 802.11g™-2003], IEEE Standared for Information technology—Telecommunications and information exhcange between systms—Local and metropolitan area networks—Specific requirements; Part 11: Wireless LAN Medium Access Control (MAC) and Physical Layer (PHY) specifications; Amendment 5: Spectrum and Transmit Power Management Extensions in the 5 GHz band in Europe; IEEE Computer Society; LAN/MAN Standards Committee; Oct. 14, 2003, 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

Notification of Transmittal of The International Search Report and The Written Opinion of the International Searching Authority, or The Declaration for International Application No. PCT/IB2007/003849; dated May 7, 2008; filed Dec. 10, 2007; 12 pages.

* cited by examiner

METHOD AND APPARATUS FOR REDUCING HOST PROCESSOR ACTIVITY DURING INTERACTION WITH PERIPHERAL DEVICES

CROSS-REFERENCE TO RELATED APPLICATIONS

This application is a continuation of U.S. patent application Ser. No. 12/330,217 filed on Dec. 8, 2008, which claims the benefit of U.S. Provisional Application No. 61/007,159, filed on Dec. 11, 2007. The disclosures of the above applications are incorporated herein by reference in their entirety.

FIELD

The present disclosure relates to data communications and more particularly to data communications between a peripheral device and a host device.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various devices such as laptop computers, personal digital assistants (PDAs), digital video devices, cellular phones, digital cameras, portable audio devices, desktop computers and computer workstations may be referred to collectively as "host devices". Host devices may be equipped with interface modules to communicate with peripheral devices, for example integrated circuit (IC) cards.

The interface modules may be, for example, Secure Digital (SD) interface modules, and the cards may be, for example, SD cards. SD cards may operate according to international standards such as the SD memory standard for memory devices and the SD input/output (SDIO) standard for input/output devices.

SUMMARY

A system is provided and includes a processing core configured to generate a request signal to transfer data between a host device and a peripheral device. The processing core is in a low power state subsequent to generating the request signal. An interface module, separate from the processing core, is configured to transmit a sequence of commands from the host device to the peripheral device based on the request signal. The sequence of commands is transmitted to initiate the transfer of the data between the host device and the peripheral device. A comparator configured to compare expected responses of the peripheral device to the sequence of commands against responses received from the peripheral device to control the transfer of the data between the host device and the peripheral device without waking up the processing core from the low power state.

In other features, a method is provided and includes generating a request signal via a processing core to transfer data between a host device and a peripheral device. The processing core is in a low power state subsequent to generating the request signal. A sequence of commands is transmitted from the host device to the peripheral device via an interface module that is separate from the processing core. The sequence of commands is transmitted responsively to the request signal. The sequence of commands is transmitted to initiate the transfer of the data between the host device and the peripheral device. Expected responses of the peripheral device to the sequence of commands are compared against responses received from the peripheral device to control the transfer of the data between the host device and the peripheral device without waking up the processing core from the low power state.

In other features, a system is provided and includes first memory for storing data and a processing core for executing software instructions on the data that is received from the first memory. The system also includes a peripheral device configured to communicate with the processing core through a peripheral control module. The peripheral control module, also referred to as a peripheral control device, includes second memory. The peripheral control module also includes a comparator for governing data transfer transactions, without interrupting the processing core, based on a comparison. The comparator therefore compares expected responses to command sequences and received responses to the command sequences. The command sequences and responses to command sequences are associated with data packets to be exchanged between the first memory and the peripheral device.

In other features, the peripheral control module includes a control register that controls transmission of the command sequences to the peripheral device when the processing core is not communicating with the peripheral device. The second memory includes a transmission command sequence buffer and a receive command sequence buffer. The control register, which is separate from the second memory, selectively provides the command sequences to the peripheral device from one of the transmission command sequence buffer and the receive command sequence buffer. The second memory includes a transmission response buffer and a receive response buffer. The control register selectively provides one of the expected responses to the comparator from one of the transmission response buffer and the receive response buffer.

In other features, the system also includes a first direct memory access (DMA) control module that controls transfers of the command sequences and expected responses from the first memory to the peripheral control module. The peripheral control module includes a second DMA control module that provides payload data associated with the packets to at least one of the processing core and the peripheral device. The first DMA control module provides the software instructions without interruption of non-memory processes of the processing core.

In other features, the peripheral device includes at least one of a secure digital (SD) card, a SD input/output (SDIO) card, and a multi-media control (MMC) card. The SDIO card includes a radio frequency (RF) transceiver module and an antenna that communicates with the RF transceiver module. The RF transceiver module is compliant with at least one of IEEE standards 802.11, 802.11a, 802.11b, 802.11g, 802.11h, 802.11n, 802.15.4, 802.16, 802.20, wireless media (WiMedia), ultra wide-band (UWB), global positioning system (GPS) devices and Bluetooth. The comparator is constructed in hardware. The system also includes hardware based pointers that cycle through the second memory.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1A:
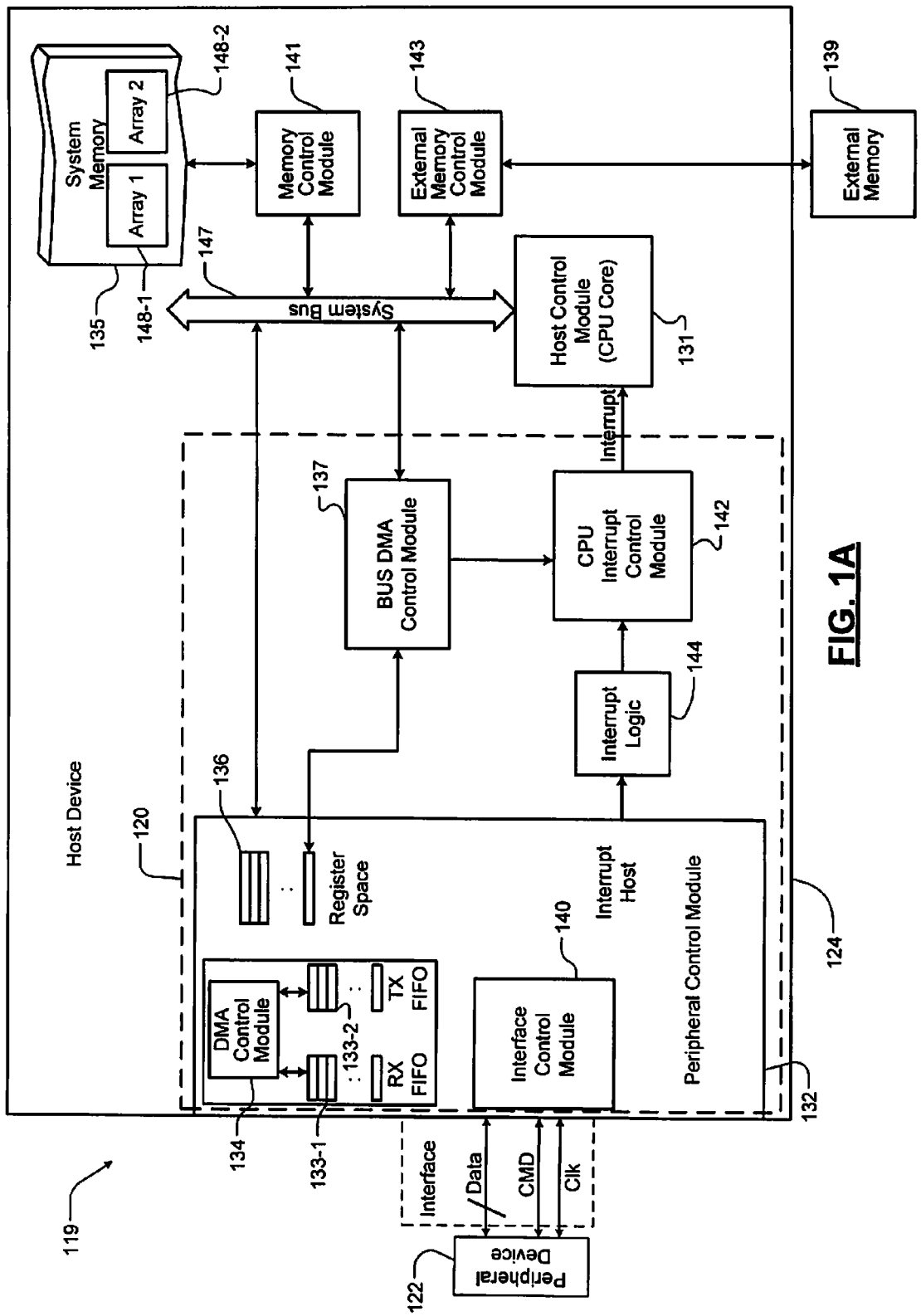
FIG. 1A is a functional block diagram of an interface system according to an embodiment of the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

The present disclosure includes a host control module, such as a central processing unit (CPU) core, of a host device that communicates with a peripheral device via a peripheral control module. The peripheral control module includes stored predetermined sequences of commands to be sent to the peripheral device and expected responses to those commands. The host control module may pre-program the peripheral control module with the commands and responses. The commands and responses may be exchanged based on data in packet headers. The peripheral control module may exchange commands and responses with the peripheral device without requiring involvement of the host control module.

Conventionally, the host control module sent a command and went into a sleep and/or wait mode for a response. The host control module would then wake-up in response to each response based on an interrupt. Because the host control module previously serviced these interrupts, host control module latency and processing bandwidth may not have been optimal.

Conventionally, responses to interrupts from the peripheral device were implemented in software and required substantial involvement of the host control module. Few errors tend to occur during command and response exchanges between peripheral devices and host devices. Consequently, the response sequence of the host device may be known before exchanges begin. In accordance with embodiments of the present disclosure, control of valid command and/or response sequences may be implemented in hardware in the peripheral control module in order to reduce the number of times the host control module is woken up.

For example, in an embodiment of the present disclosure, the host control module may request data from a peripheral card, such as a secure digital input/output (SDIO) card, and initiate peripheral control module operations. The host control module may then enter a sleep state. The peripheral card may transmit a packet of data. The peripheral control module interacts with the peripheral card based on packet header communications (i.e. exchanges of commands and responses). The peripheral control module wakes up the host control module when the command and response exchanges are completed or if there is a problem with the command and response exchanges. However, in an embodiment of the disclosure, for valid command and response exchanges, there is no need to wake up the host control module, at least until the exchanges are completed. When woken, either at the time of completion of the exchanges or when there is a problem with the command and response exchanges, the host control module may receive the data within the packet.

Figure 1B:
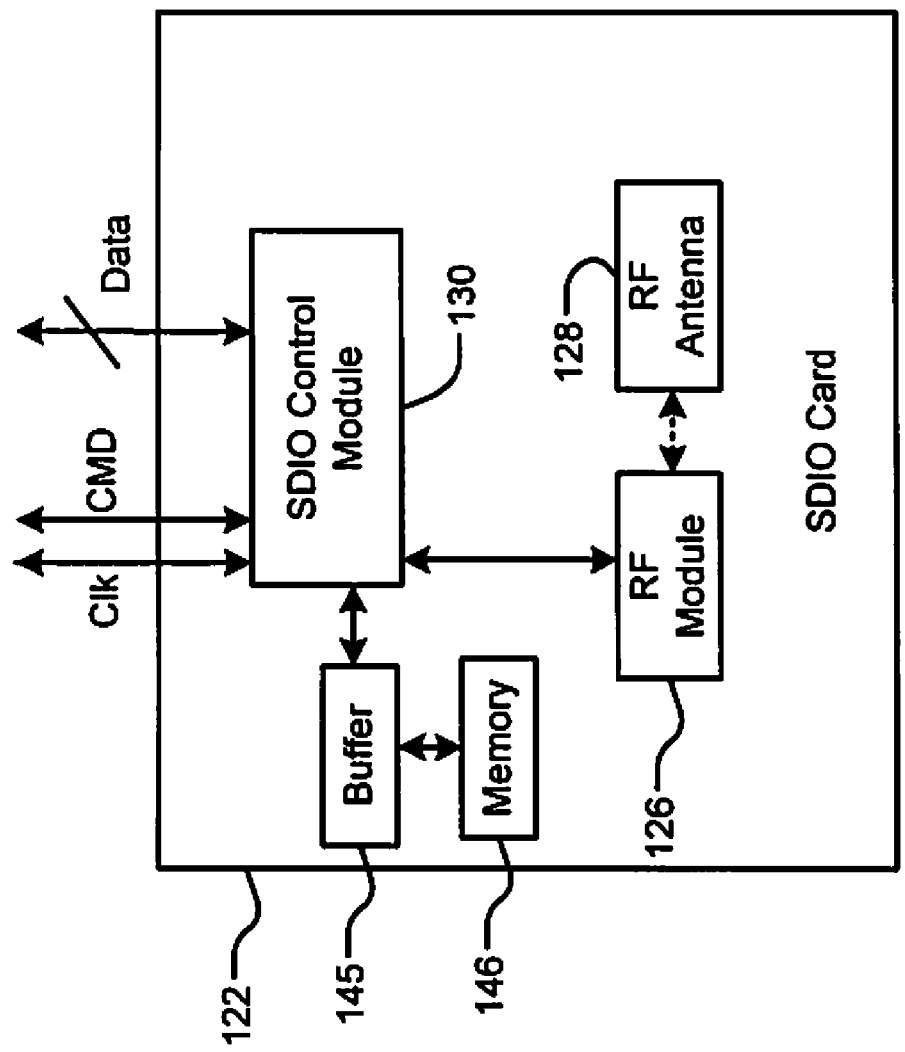
FIG. 1B is a functional block diagram of a peripheral device according to an embodiment of the present disclosure.
Figure 1C:
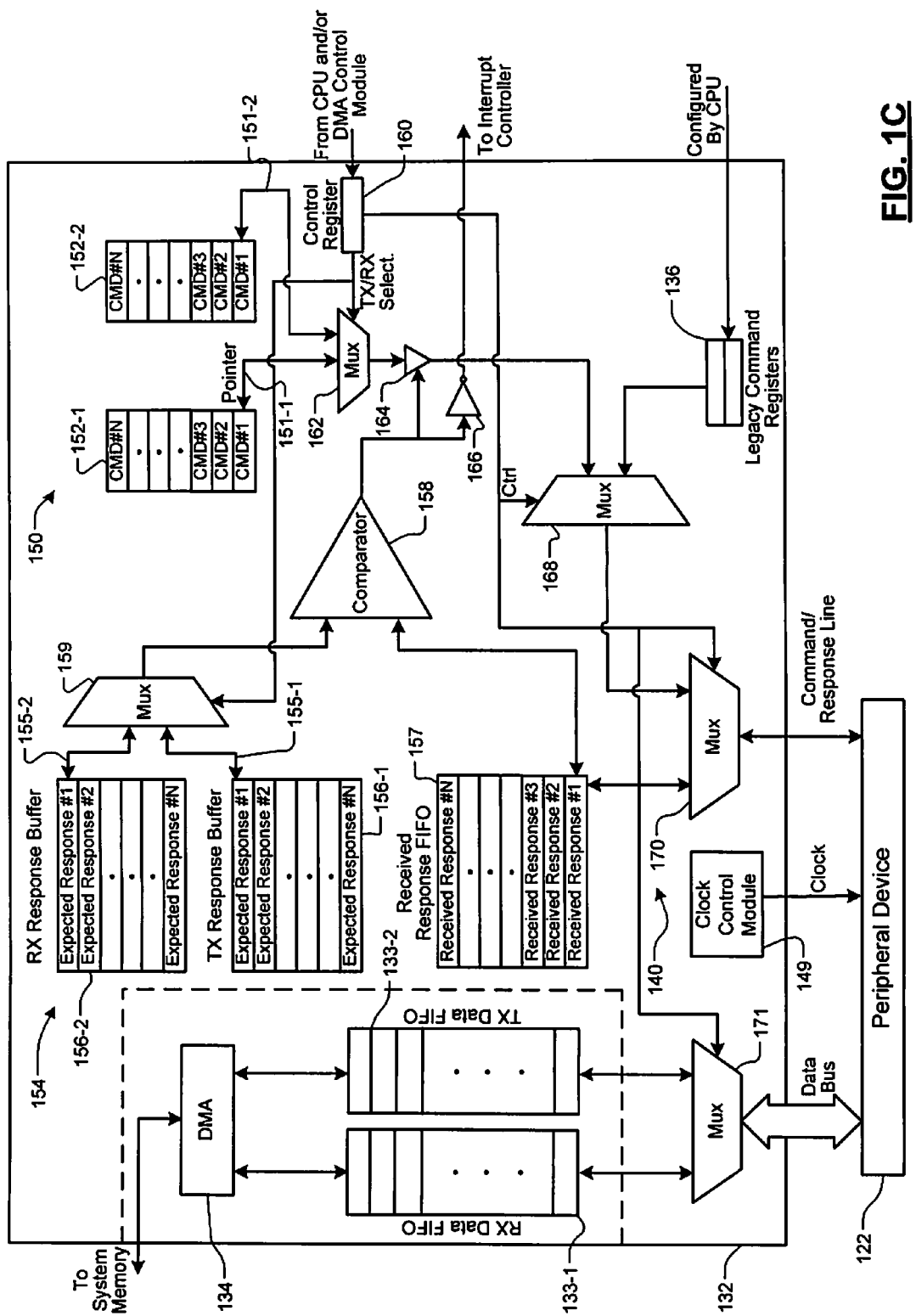
FIG. 1C is a functional block diagram of a peripheral control module according an embodiment of to the present disclosure.

Referring now to FIGS. 1A-1C, an interface system 119 allows a peripheral device 122 to communicate with an interface sub-system 120 of a host device 124. The host device 124 may include a mobile device, such as a laptop computer, personal digital assistant (PDA), digital video device, cellular phone, or digital camera. The host device 124 may also include any suitable system capable of interfacing and otherwise communicating with peripheral cards, such as for example, a desktop computer, computer workstation, hard disk drive (HDD), digital-versatile-disk (DVD), vehicle system, high definition television (HDTV), and the like.

In FIG. 1B, the peripheral device 122 may be a SD card, a SDIO card, a multimedia card (MMC) card, and/or any other type of peripheral card that is compliant with a data transfer protocol that uses commands. The peripheral device 122 may be referred to herein as a SDIO card for purposes of example and may optionally include a radio frequency (RF) transceiver module 126 and RF antenna 128 or other suitable interface with host device 124. The optional RF transceiver module 126 may be compatible with any of IEEE standards 802.11, 802.11a, 802.11b, 802.11g, 802.11h, 802.11n, 802.15.4, 802.16, 802.20, wireless media (WiMedia)/ECMA, ultra wide-band (UWB), GPS devices, Bluetooth, etc. Alternatively, the peripheral device 122 may not be a wireless device. For example, the peripheral device 122 may also include a SDIO compliant debugging card (for retrieving even log files) and/or a protocol monitor/sniffer.

The peripheral device 122 may include a card control module 130 that allows peripherals, which may be added to or may communicate with the peripheral device 122, to comply with the SDIO standard. The card control module 130 may also control SD and SDIO applications within the host device 124. The peripheral device 122 may include a buffer 145 and/or other memory 146 to store data and/or processes that may be used to implement SDIO functions.

The host device 124 may include a host control module 131 and a peripheral control module 132 that may implement the SD standard. The peripheral control module 132 may include first-in-first-out (FIFO) buffers 133-1, 133-2 that temporarily store incoming (RX) and outgoing (TX) data from packets and/or signals, respectively. The peripheral control module 132 may also include an internal direct memory access (DMA) control module 134 that effectively pumps incoming and outgoing data into or out of system memory 135 and/or external memory 139 using the FIFO buffers 133-1, 133-2. In other words, the DMA control module 134 moves data between system memory 135 and peripheral control module FIFO buffers 133-1, 133-2. For example, when header communications are complete, the DMA control module 134 may move payload data from the packet using the RX and TX FIFO buffers 133-1, 133-2.

The system memory 135 and external memory 139 may be accessed through one or more memory control modules 141, 143. The internal memory 135 may include, for example, static RAM (SRAM), and the external memory 139 may include, for example, double data rate (DDR) synchronous dynamic RAM (SDRAM). The peripheral control module 132 may also include registers 136 that that temporarily store commands from the host control module 131 to be sent to the peripheral device 122. The host control module may communicate with various system components and memory control modules 141, 143 via a system bus 147.

As mentioned, the peripheral device 122 may include an SDIO card. SDIO cards may use several standardized commands, which may be command signals/tokens issued by the host device 124, and responses, which may be response signals/tokens from the peripheral device 122 to respective commands. The commands may be SDIO values, such as CMD52 or CMD53 token values, and the responses may be R5 token values that are expected to be received in response to the CMD52, CMD53 commands. For example, CMD52 may be used to read data from the peripheral device 122. CMD53 may initiate read/write operations with the peripheral device 122. R5 from the peripheral device 122 may respond to any of the commands to indicate that the command was received and/or handled.

The peripheral control module 132 may communicate with the peripheral device 122 via an interface control module 140. The communications may include clock, command (CMD), response (R), and data signals that may be generated by the peripheral control module 132 and/or the peripheral device 122. The peripheral control module 132 may include a clock control module 149 that controls clock operations. The peripheral control module 132 may also interrupt the host control module 131 to indicate that the host control module 131 should handle SD communications. An interrupt control module 142 may receive and process the interrupts and may wake-up the host control module 131.

The host device 124 may also include a DMA control module 137 that communicates with the registers within the interrupt control module 142, such as registers 136, and the host control module 131. The peripheral control module 132 may also be in communication with the DMA control module 137 and with the interrupt control module 142 through, for example, a logic circuit 144. The logic circuit 144 is operative to selectively pass interrupts from the peripheral control module 132, the DMA control module 137 and/or the interrupt control module 142. The logic circuit 144 may include combinational logic gates that may include AND gates, NAND gates, OR gates, NOR gate, and the like. Alternatively, the logic circuit may be substituted with a processor that is configurable and controllable by the host control module 131. The DMA control module 137 may use memory 135 to accommodate incoming responses and/or data from the peripheral device 122.

In FIG. 1C, the peripheral control module 132 may implement the lower/physical layers of peripheral communication protocols (e.g. SDIO communication protocols). The peripheral control module 132 may include a pre-programmed command buffer 150. In other words, commands in the command buffer 150 are selected and stored before an interrupt from the peripheral device 122 is sent.

The peripheral control module 132 may manage the command buffer 150 as a FIFO queue in hardware, though alternative embodiments may be used. The peripheral control module 132 may include pointers 151-1, 151-2 that point to the beginning/end ($1^{st}$/Nth) of the command buffer 150 and roll over to the beginning again when the entire command buffer 150 is executed. Logic (not shown) within the peripheral control module 132 may advance the pointers 151-1, 151-2. The pointers 151-1, 151-2 may point to respective TX and RX FIFO buffers 152-1, 152-2 of the command buffer 150. The TX FIFO buffer 152-1 may hold a sequence of commands to be executed when a packet is sent by the host device 124. The RX FIFO buffer 152-2 may hold a sequence of commands to be executed when the peripheral device 122 has a packet for the host device 124 to read. The TX and RX FIFO buffers 152-1, 152-2 may be pre-programmed by the host control module 131.

The peripheral control module 132 may also include a pre-programmed response buffer 154. The peripheral control module 132 may manage the response buffer 154 as a FIFO queue in hardware, though alternative implementations may be used. For example, the peripheral control module 132 may advance pointers 155-1, 155-2 of the response buffer 154 to the beginning/end ($1^{st}$/Nth) of the response buffer 154 and roll the pointers 155-1, 155-2 over to the beginning again when the entire response buffer 154 is executed. Logic (not shown) within the peripheral control module 132 may advance the pointers 155-1, 155-2. The pointers 155-1, 155-2 may point to respective TX and RX FIFO buffers 156-1, 156-2 of the response buffer 154. The TX FIFO buffer 156-1 may hold a sequence of expected responses to TX commands from the peripheral device 122 when a packet is sent by the host device 124. The RX FIFO buffer 156-2 may hold a sequence of expected responses to RX commands when the peripheral device 122 has a packet for the host device 124 to read. The TX and RX FIFO buffers 156-1, 156-2 may be pre-programmed by the host control module 131.

A received response buffer 157 may receive responses from the peripheral device 122 ($1^{st}$ through Nth responses) during communication exchanges for TX or RX packets. A comparison device, such as a comparator 158 may compare the contents of the received response buffer 157 and the TX and RX FIFO buffers 156-1, 156-2 of the response buffer 154.

A selection device, such as a multiplexer 159 may select whether an entry from the TX FIFO buffer 156-1 or the RX FIFO buffer 156-2 will be compared to an entry of the received response buffer 157. For example, when a TX packet is being processed, the multiplexer 159 may select a response from the TX FIFO buffer 156-1. Further, when an RX packet is being processed, the multiplexer 159 may select a response from the RX FIFO buffer 156-2. The host control module 131 (FIG. 1A) may set a control register 160 that advances command and response sequence exchanges in the peripheral control module 132 independent of further commands from the host control module 131. The host control module 131 may set the control register 160 for incoming or outgoing packets. In other words, once set, the control register 160 may advance exchanges without further communication with the host control module 131 until the host control module 131 is interrupted.

For example, the control register 160 may control the multiplexer 159 to select whether expected responses from TX Response buffer 156-1 or RX Response buffer 156-2 are supplied to comparator 158. The control register 160 may also selectively control another selection device, such as a multiplexer 162. The multiplexer 162 may select between the TX and RX FIFO buffers 152-1, 152-2 of the command buffer 150 based on whether the host device 124 is sending or receiving packets. For example, when a TX packet is being processed, the multiplexer 162 may select a command from the TX FIFO buffer 152-1. Further, when an RX packet is being processed, the multiplexer 162 may select a command from the RX FIFO buffer 152-2.

As a result, the control register 160 controls whether TX or RX command tokens are provided by TX and RX FIFO buffers 152-1, 152-2, and whether TX and RX expected received responses are provided by TX and RX response buffers 156-1, 156-2 for comparison to received TX and RX tokens.

The output of the comparator 158 may correspond to a logical zero or one if the comparison fails and a logical one or zero if the comparison succeeds. The output of the comparator 158 may control a tri-state buffer 164 that enables sending the next command out of the command buffer 150 to the peripheral device 122. The output of the comparator 158 may also control a logic gate, such as an inverter 166 that may trigger an interrupt signal to the host control module 131 via the interrupt control module 142.

The control register 160 may also control a selection device, such as multiplexer 168. Multiplexer 168 may therefore selectively provide an output that corresponds to one of a command from the host control module 131 (e.g. host control module 131 fed legacy commands) and the selected command from the TX and RX FIFO buffers 152-1, 152-2 of the command buffer 150. The control register 160 may also control other selection devices, such as multiplexers 170, 171 that provide command/response line communications and data bus communications, respectively.

Figure 2:
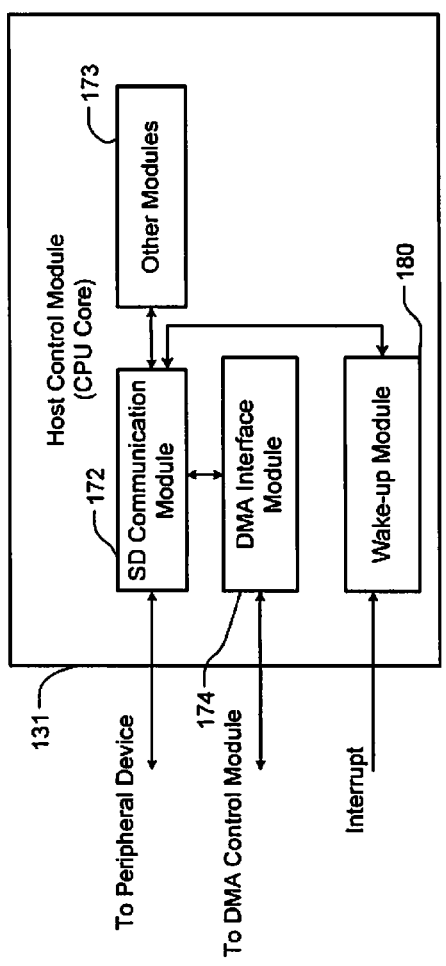
FIG. 2 is a functional block diagram of a host device control module according to an embodiment of the present disclosure.
Figure 3:
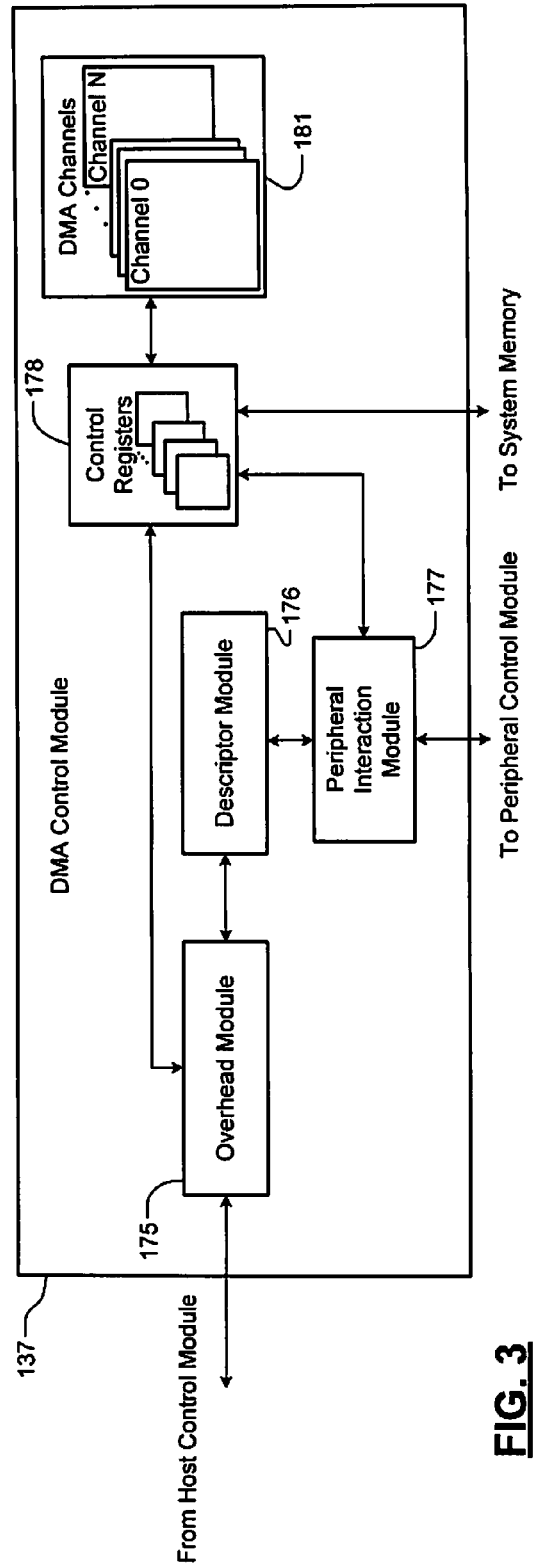
FIG. 3 is a functional block diagram of a DMA control module according to an embodiment of the present disclosure.

Referring now to FIGS. 2-3, the host control module 131 and the DMA control module 137 are illustrated. A communication module 172 that communicates with various other modules 173 of the host control module 131 may request SD information from the peripheral device 122. A DMA interface module 174 of the host control module 131 may initiate DMA processes so that the host control module 131 may sleep and/or dedicate processing to other systems.

The host control module 131 may command the DMA control module 137 via descriptors, which may be DMA commands. For example, using descriptors, the host control module 131 may specify to the DMA control module 137 source and destination addresses for data, the size of data to be transferred and actions to be performed on the data. Actions performed on data may include transferring the data from system memory 135 to the command buffer 150 and response buffer 154 (FIG. 1C) and/or transferring packet data from the peripheral control module 132 to system memory 135 (FIG. 1A). Either the host control module 131 or the DMA control module 137 (as instructed by the host control module 131) prepares a chain of descriptors or other representative values for the fixed overhead that will be used by the peripheral control module 132.

The DMA control module 137 includes a Peripheral interaction module 177 that allows the DMA control module 137 to copy blocks of data from one location to another without the need to interrupt the host control module 131. Each descriptor may describe a single token stored in memory, for example, CMD52, CMD53, and R5 tokens. The DMA control module 137 may include registers 178 that may store the descriptor sequence and/or the tokens to which the descriptors refer.

The DMA control module 137 may include channels 181 that may be configured by the host control module 131 to service any kind of data transfer and that may be controlled by registers 178. Each of the channels 181 may be used to convey data to/from one or more internal or external devices (i.e. the channels 181 may be actively executing). The channels 181 may be configured based on the depth of the FIFO buffers 133-1, 133-2 and bandwidth requirements for the host device 124. When multiple channels are actively executing, each channel is serviced with a burst of data. After each burst of data, the DMA control module 137 may perform a context switch to another one of the channels 181 that is actively executing. The DMA control module 137 may perform context switches based on whether a channel is actively executing, whether the peripheral device 122 is currently requesting service, and the priority of the channel. A DMA descriptor may be, for example, a four-word (32-bits per word) block, aligned on a 16-byte boundary in system memory 135 that may be stored in the control registers 178 and that may control the channels 181. In other words, DMA descriptors may control the channels 181 by causing one or more of the channels 181 to actively execute or by switching between the channels.

The descriptor module 176 may generate descriptors that represent or may be used to address command and/or response tokens. The DMA interface module 174 may also transmit descriptor information to the descriptor module 176. The descriptor information may indicate positions in the memory 135 where the command tokens and response tokens are stored. Each of the descriptors may include a word, phrase, or alphanumerical term that may be stored in DMA related memory (for example the memory 135 or registers 178) and that may identify a command or response token. The descriptors may describe the content of data stored in the DMA related memory. For example, the control module 131 may prepare arrays 148-1, 148-2 of memory cells in system memory 135. A first array 148-1 may include a sequence of expected responses, such as R5 tokens or descriptors. A second array 148-2 may include a sequence of commands to be executed, such as CMD52, CMD53 tokens or descriptors. These command and response tokens and/or descriptors may also be stored in the command buffer 150 and response buffer 157, respectively, in predetermined orders.

In order to set up the peripheral control module 132 to handle interrupts, the control module 131 may cause the DMA control module 137 to transfer DMA descriptors, representing addresses in the system memory 135 that include tokens, to the peripheral control module 132. A peripheral interaction module 177 may transmit/receive command, response and data signals to/from the peripheral control module 132.

A wake-up module 180 of the host control module 131 may receive an interrupt from the CPU interrupt control module 142 when the peripheral control module 132 is finished handling the interrupt header. The host control module 131 may mask the interrupt when the peripheral control module 132 is handling interrupt headers.

Figure 4:
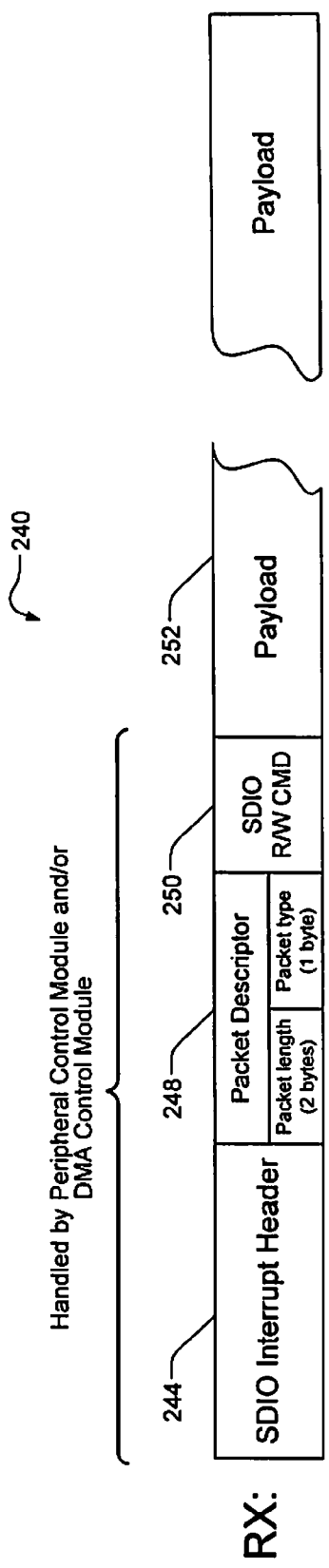
FIG. 4 is a block diagram of a receive path packet that is at least partially processed by the peripheral control module according to an embodiment of the present disclosure.
Figure 5:
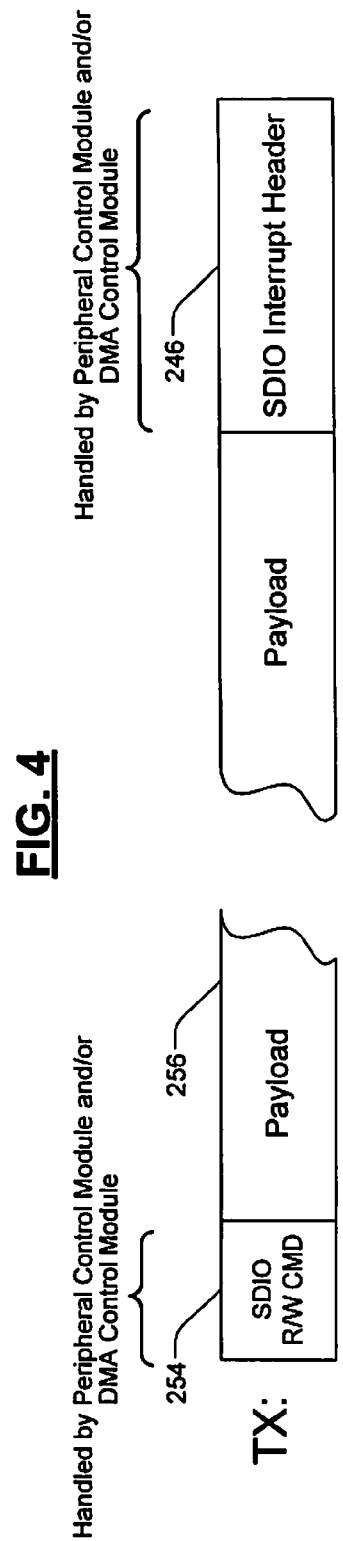
FIG. 5 is a block diagram of a transmit path packet that is at least partially processed by the peripheral control module, according to an embodiment of the present disclosure.

Reference is now made to FIGS. 4 and 5 which illustrate SDIO packets in the receive and transmit paths respectively. Packets transferred over SDIO may contain a fixed overhead in the form of interrupt headers. To provide a frame of reference, packets 240 sent from the peripheral device 122 to the host device 124 may travel in a "receive" direction. Packets 242 sent from the host device 124 to the peripheral device 122 may travel in a "transmit" direction. Each data packet 240, 242 begins with or ends with an interrupt header 244, 246, respectively, that may be handled by the DMA control module 137 and/or the interface control module 140 as seen in FIGS. 1A-1C. The peripheral device 122 attempts to send an interrupt to the host device 124 for every packet the peripheral device 122 receives from a network. The interrupt header 244 informs the host device 124 of the reason for the interrupt. The interrupt header 246 informs the host device 124 that the peripheral device 122 received the data correctly and that new data may now be sent. The host control module 131 may set the control register 160 in response to detection of the interrupt header 246 so that the peripheral control module 132 handles command/response exchanges.

Receive packets 240 may also include a packet descriptor 248 that may indicate packet length and packet type. The packet descriptor 248 may be followed by SDIO read and/or write (R/W) commands 250 that are followed by payload data 252. Transmit packets 242 may begin with an SDIO (R/W) command 254 followed by payload data 256, which may be followed by the SDIO interrupt header 246.

Figure 6:
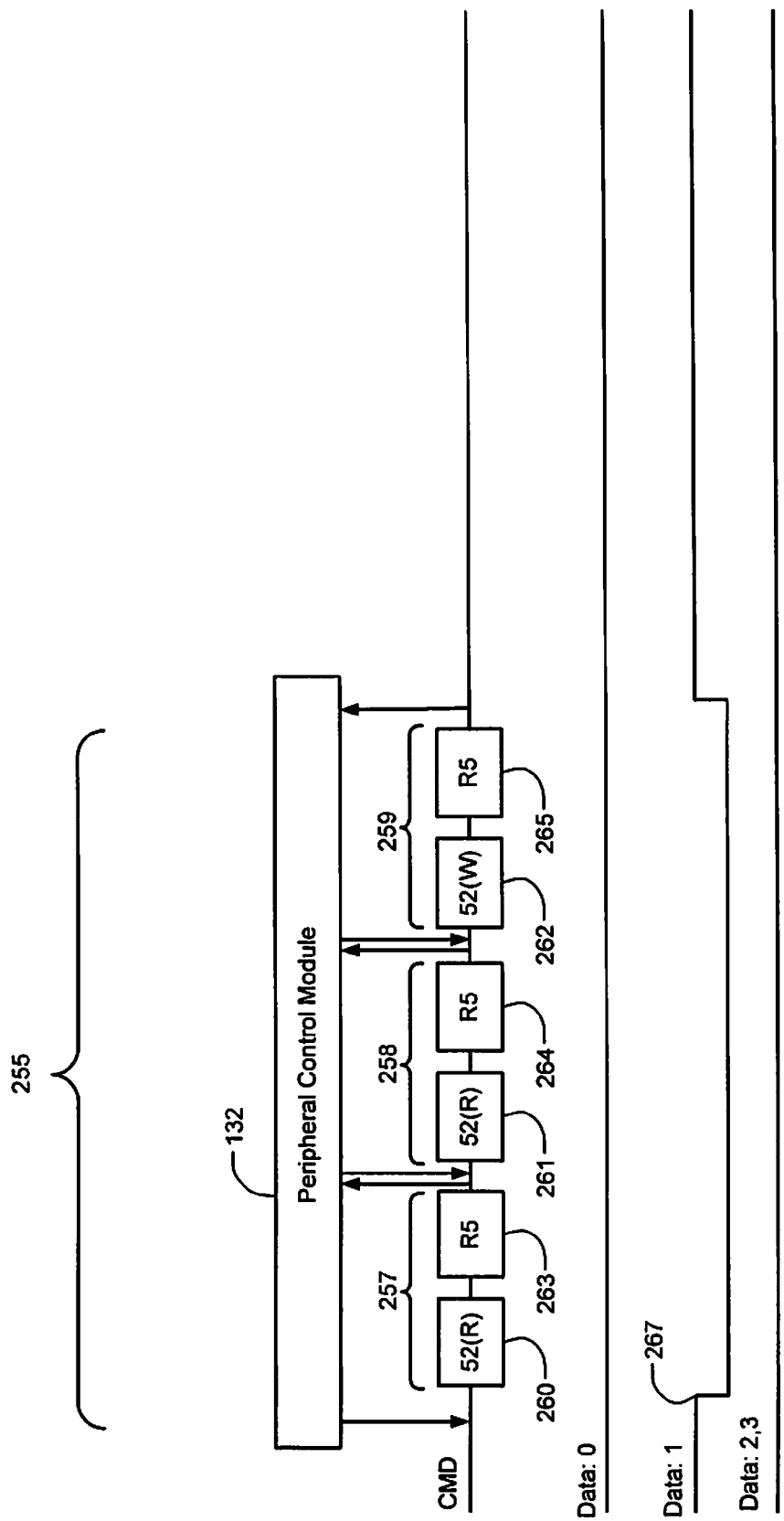
FIG. 6 is a timing diagram of interrupt header communications conducted at least partially by the peripheral control module, according to an embodiment of the present disclosure.

Referring now to FIG. 6, examples of command sequence exchanges 255 between the host device 124 and the peripheral device 122 are illustrated. The command sequence exchanges 255 may be made through a command line (CMD) and multiple data lines (Data [3:0]) (illustrated, for example, in FIG. 1A between the peripheral device 122 and the host device 124). The interrupt headers 244, 246 cause fixed interrupt command sequence exchanges 255 that may travel through the command line. The interrupt headers 244, 246 may include a sequence of standard CMD52 command tokens 260-262.

The peripheral device 122 may respond to the commands with standard R5 response tokens 263-265. The commands 260-262 and corresponding responses 263-265 may each be referred to as a command response set 257-259. Each of the response tokens 263-265 from the peripheral device 122 may cause an interrupt to be sent to the host control module 131 so that the host control module 131 may handle the next command. However, the peripheral control module 132 and/or DMA control module 137 may handle the interrupts instead of allowing them to pass to the host control module 131.

In the receive direction, the interrupt header 244 informs the peripheral control module 132 and/or the DMA control module 137 (based on CMD52 tokens 260-262 and respective R5 token responses) that the primary function of the peripheral device 122 has interrupted the host device 124. This interrupt may indicate that an event 267 has occurred. An event may include the peripheral device 122 receiving a network packet that is intended for the host device 124. Another event may include a response sent from the peripheral device 122 to the host device 124 that indicates the peripheral device 122 has successfully received/transmitted the previous packet and is now ready to receive the next packet. For example, the event 267 may be a "TX done" interrupt. The TX FIFO buffer 152-1 may hold a sequence of commands executed when a packet is sent. The commands may be executed for the "TX done" interrupt and may correspond to command sequence exchanges 255.

Figure 7:
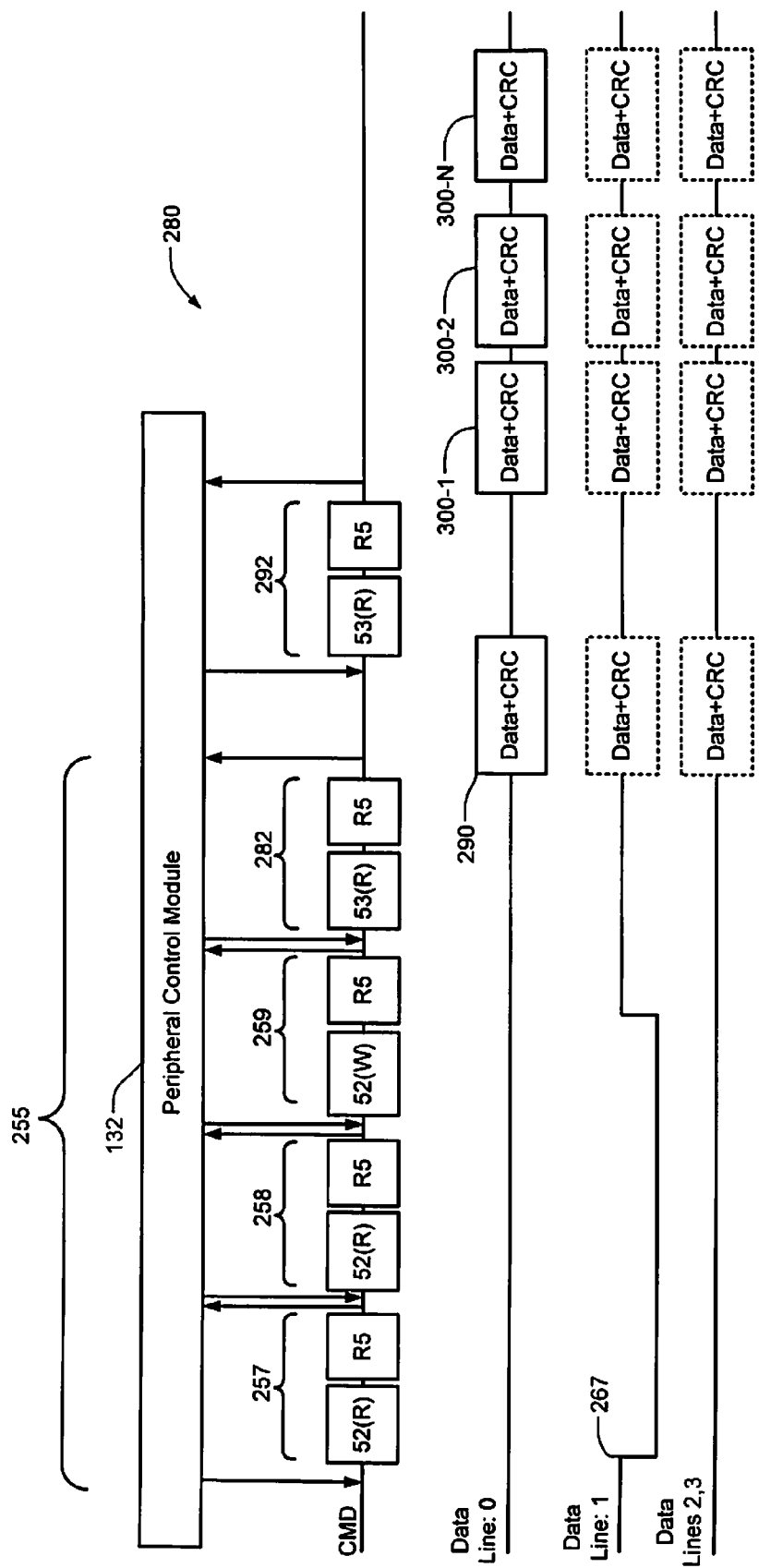
FIG. 7 is a timing diagram of receive path communications conducted at least partially by the peripheral control module, according to an embodiment of the present disclosure.

Referring now to FIG. 7, an example of a receive direction communication 280 is illustrated. A receive direction communication 280 may include, for example, the host device 124 receiving a packet from the peripheral device 122. Additional packet communications 282, which may include exchanges of command and response tokens may follow command sequence exchanges 255 in the command line. The peripheral control module 132 and/or the DMA control module 137 reads packet data 290 from the peripheral device 122 in one of the data lines. All data communications may include cyclical redundancy checks (CRCs), or other suitable error checks, to detect transmission errors. In an accordance with an embodiment, the SDIO read command 250 initiates SDIO read communications 292, and data 300-1, 300-2, . . . , and 300-N are transmitted to the host device 124 via data line 0 and/or data lines 1-3, depending on the desired data transfer rate and/or the amount of data being transferred. Increasing the number of data lines increases ability to handle data because the data may be transferred in parallel over multiple data lines rather than in series over a single data line. Further, any of the data lines 0-3 may be used to indicate an event 267.

Figure 8:
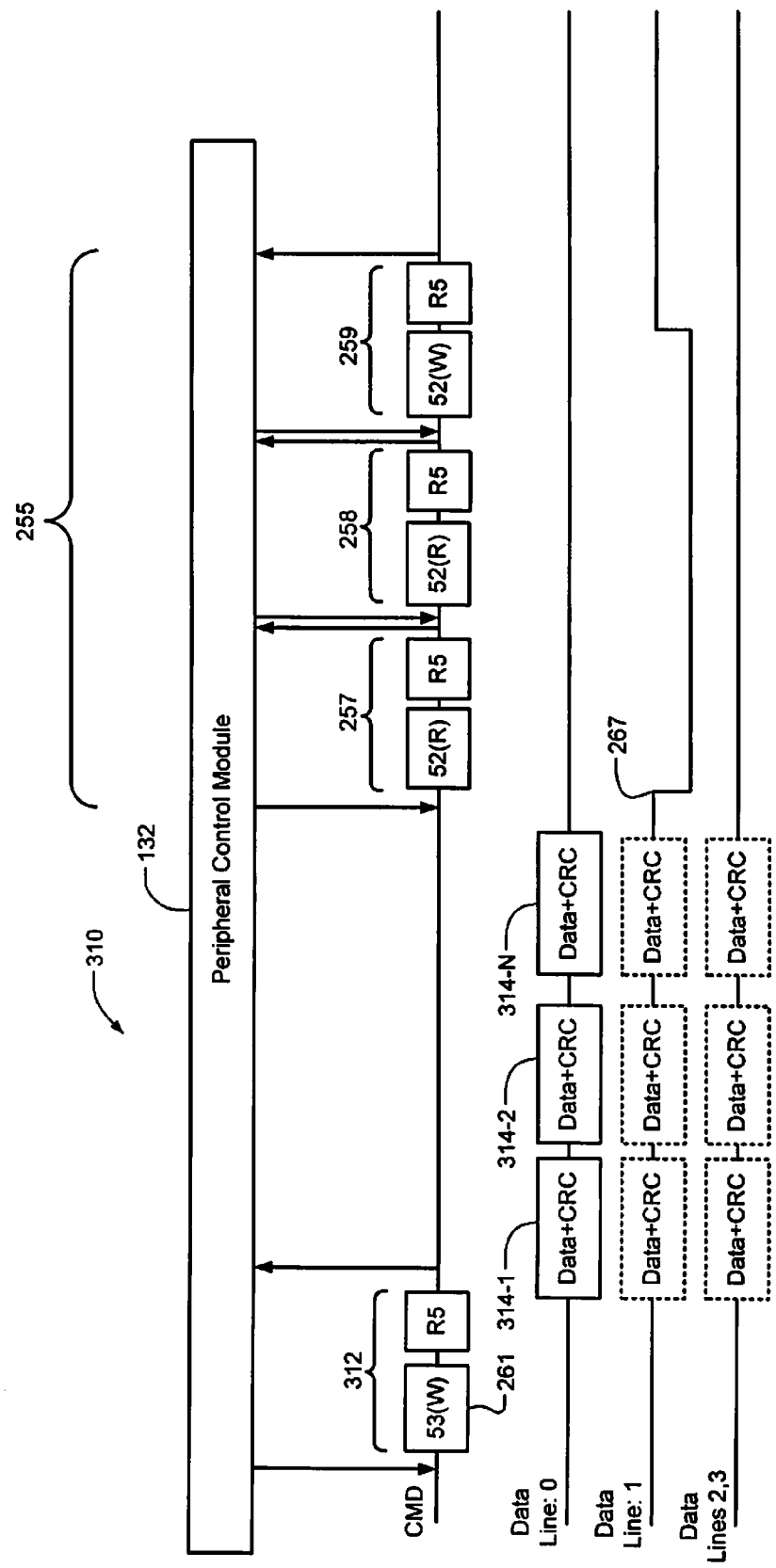
FIG. 8 is a timing diagram of transmit path communications conducted at least partially by the peripheral control module, according to an embodiment of the present disclosure.

Referring now to FIG. 8, an example of a transmit direction communication 310 is illustrated, where a packet, such as the one illustrated in FIG. 5, is sent by the host device 124. The SDIO write command 261 initiates SDIO write communications 312, and data 314-1, 314-2, . . . , and 314-N are transmitted, in response to the SDIO write command 261, to the peripheral device 122 via data line 0 and/or data lines 1-3. Multiple data lines (e.g. data lines 1-3) may be used to increase data transfer rates relative to a single line (e.g. data line 0). Further, any of data lines 0-3 may indicate a transmission complete event 267. The header 246 follows the data 314-1, 314-2, . . . , and 314-N.

Figure 9:
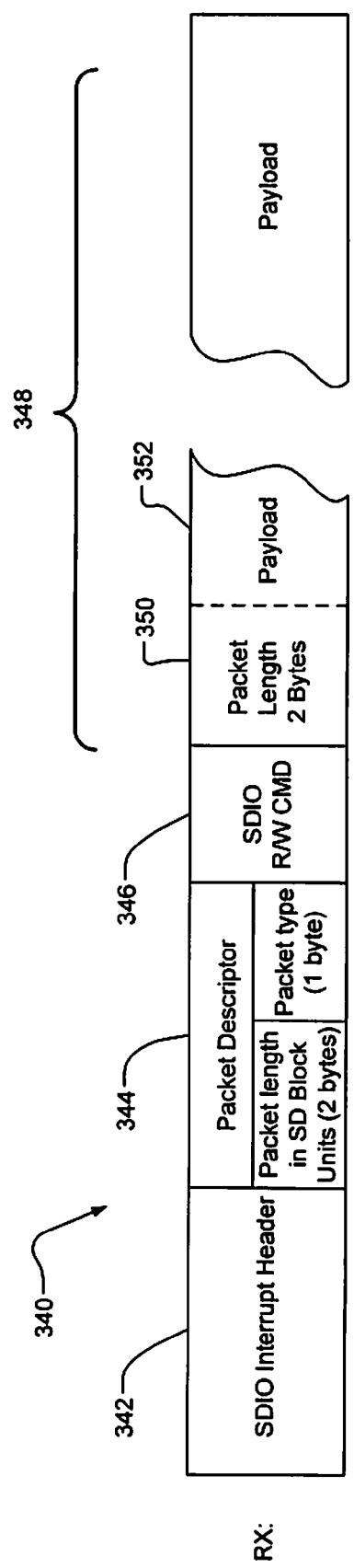
FIG. 9 is a block diagram of a modified receive path packet according to an embodiment of the present disclosure.

Referring now to FIG. 9, a modified packet 340 is illustrated in accordance with an embodiment of the present disclosure. The packet includes an interrupt header 342, a packet descriptor 344, a SDIO read/write command 346, and a payload 348 that includes packet length data 350 and payload data 352. The command-response sequence that precedes the actual data exchange (read or write) between the host device and the peripheral device may be fixed and thus may be predicted in advance. The fixed length may be used to define the packet length data 350.

The host control module 131 may not "know" in advance what size of packet is about to be read from the device, as the packet length may vary from packet to packet. Therefore, after the first CMD53 token has been issued and properly responded to, the peripheral device 122 may interrupt the host control module 131 to interpret the packet header that has been read out of the peripheral device 122. The host control module 131 may then calculate an integer number of blocks that can contain the packet and may issue a CMD53 token with that number of blocks.

However, in order to avoid waking up the host control module 131, the peripheral device 122 may calculate the integer number of memory blocks that can contain the packet payload length plus a length of a header. The header may include a number of bits added to the payload 348 of a packet that includes the respective length data. The DMA control module 137 and/or the host control module 131 may therefore read the length data from the packet and anticipate when interrupt header operations may be needed. The host control module 131 may command the DMA control module 137 to load the command buffer 150 and response buffer 154 and set the command register 160 based on anticipated header operations.

Figure 10:
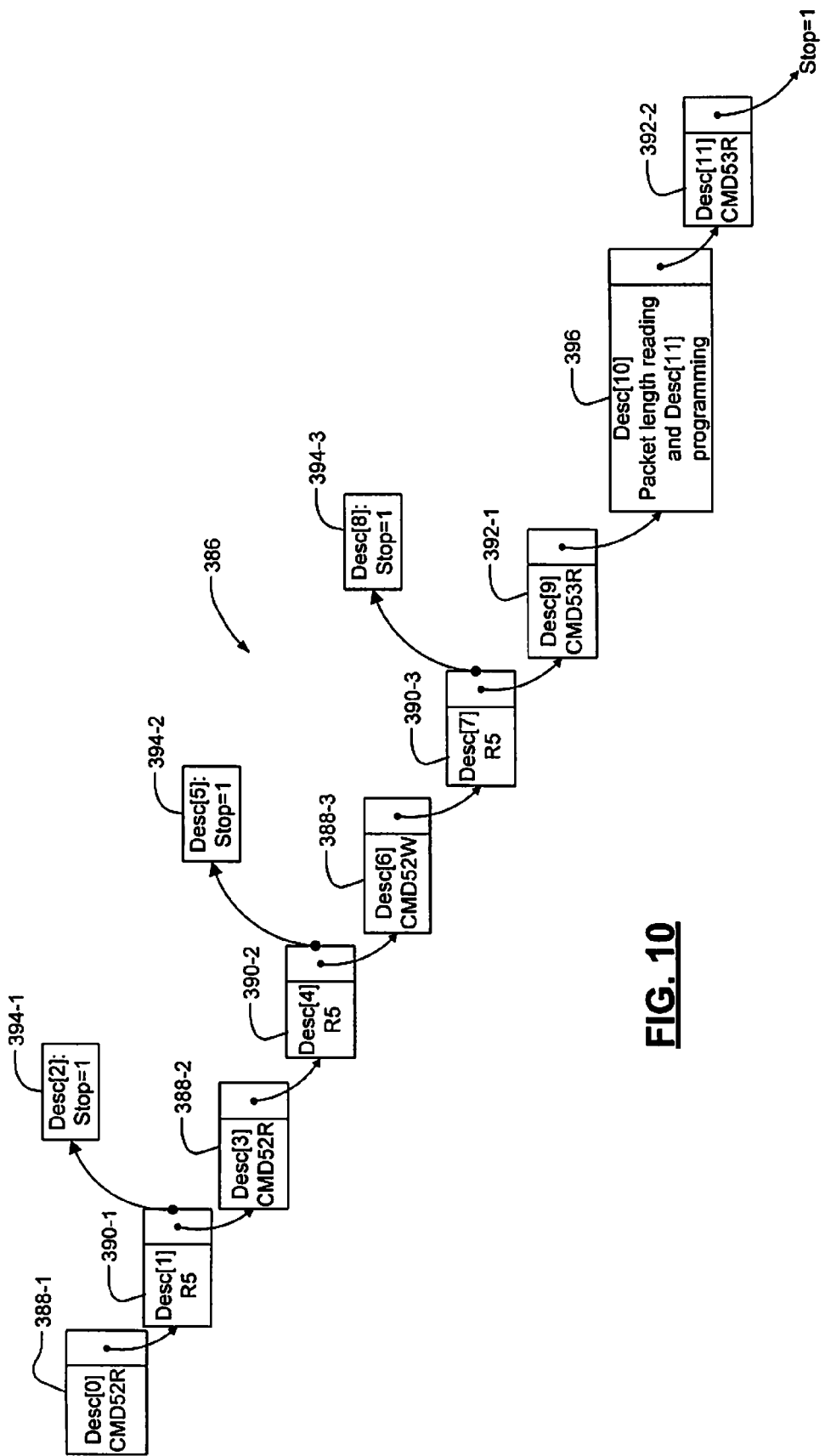
FIG. 10 is a block diagram of descriptors used by the peripheral control module according to an embodiment of the present disclosure.

Referring now to FIG. 10, a functional block diagram 386 illustrates the descriptors and links between them. The host control module 131 may command the DMA control module 137 via descriptors, which may be DMA commands. For example, using descriptors, the host control module 131 may specify to the DMA control module 137 source and destination addresses for data, the size of data to be transferred and actions to be performed on the data. Therefore, the host control module 131 may direct the DMA descriptor module 176 to descriptors. The DMA control module 137 may then pump the respective commands/responses into the peripheral control module 132 based on the descriptors. The descriptors may include, for example, three CMD52 descriptors 388-1, 388-2, 388-3 of 12 bytes each, three R5 descriptors 390-1, 390-2, 390-3 for comparison with received R5 responses, two CMD53 descriptors 392-1, 392-2 of 12 bytes each, three dummy descriptors 394-1, 394-2, 394-3, and a packet length reading descriptor 396. The dummy descriptors may halt peripheral control module 132 and re-activate the host control module 131.

Figure 11:
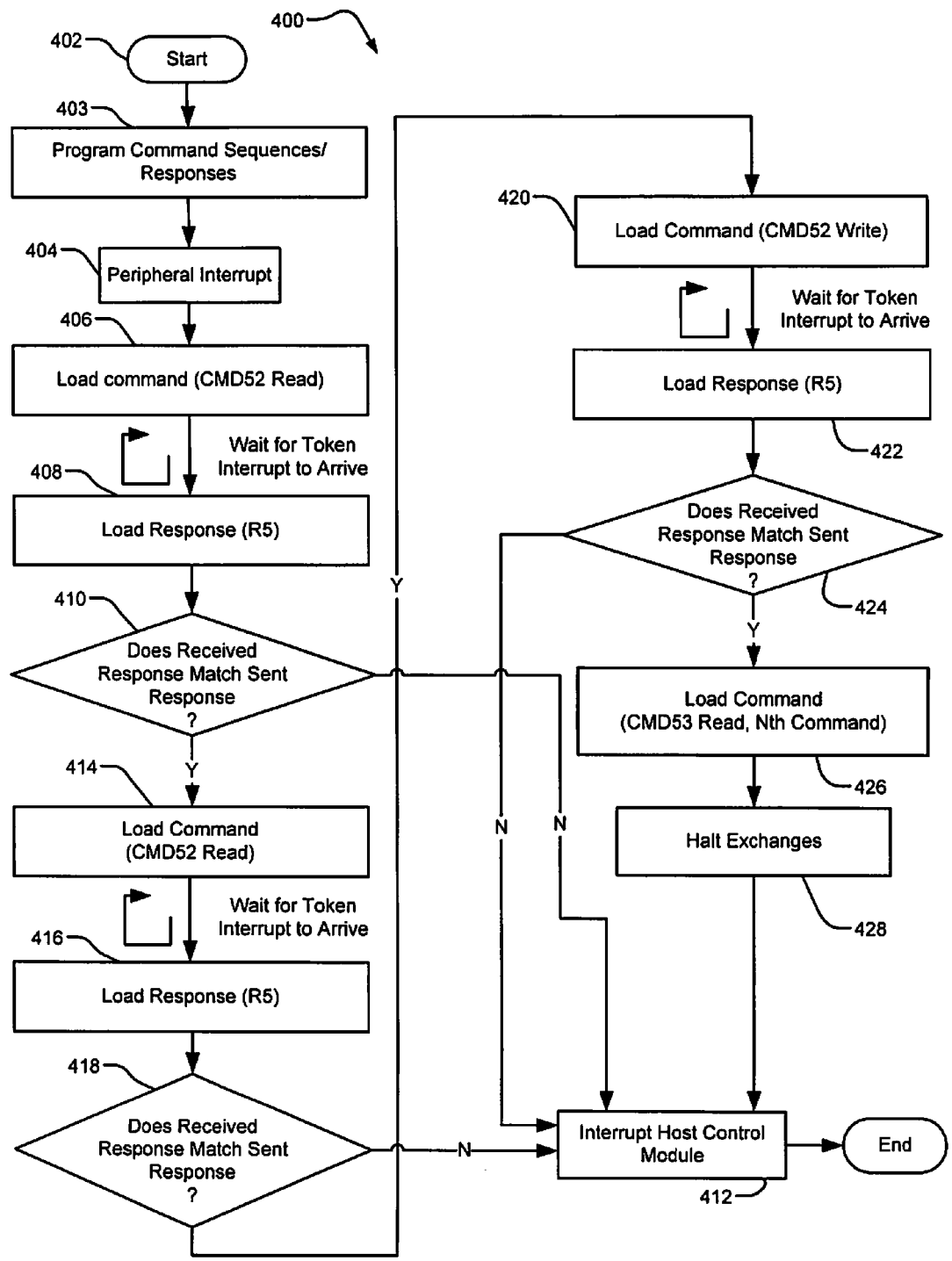
FIG. 11 is a block diagram of a method for operating an interface system according to an embodiment of the present disclosure.

Reference is now made to FIG. 11 which is a flow diagram 400 illustrating a method for interfacing between two devices without waking up a host control module 131 for exchanging commands and responses, unless an unexpected event occurs. An unexpected event may include an expected response not matching a received response, however, unexpected events will be rare, according to the present disclosure. Control starts in step 402. In step 403, the host control module 131 pre-programs the command/response sequences in the peripheral control module 132 and sets the control register 160. For example, the host control module 131 may command the DMA control module 137 to pump descriptors into the command buffer 150 and response buffer 154. Alternatively, the host control module 131 may input commands and responses (token values or other command/response values) into the command buffer 150 and response buffer 154. Consequently, comparisons of expected to received commands and responses may include comparison of descriptors and/or comparison of commands/response token values and/or comparison of other command/response values in the comparator 158 of FIG. 1C, without interrupting the host control module 131. However, exchange of "command tokens" and comparison of "response tokens" will be used herein for purposes of example.

In step 404, the peripheral device, which may include an SDIO card, sends an interrupt to the host device 124. In step 406, the peripheral control module 132 responds to the interrupt based on the control register 160 and loads a first command token, such as CMD52. CMD52 corresponds to an instruction to check a register of the peripheral device 122 that includes the pending interrupt. The peripheral control module 132 waits for the response token, such as an R5 token, to arrive from the peripheral device 122. The peripheral control module 132 may wait for a predefined time based on clock control module signals. The peripheral device 122 and/or the peripheral control module 132 may generate an interrupt to the interrupt control module 142 based on the R5 response token.

In step 408, the peripheral control module 132 loads the expected response token (e.g. R5 token). In step 410, if, in the exceptional case, the peripheral control module 132 determines that the expected response token does not match the received response token, then the peripheral control module 132 interrupts the host control module 131 in step 412. For example, the comparator 158 may determine that a value of the expected response token does not match a value of the received response token, thus causing an interrupt to be sent. As mentioned, however, interrupts from the peripheral control module 132 will be the exception. Usually, the comparator 158 will find a match between the value of the expected response token and the value of the received response token, thus not requiring an interrupt to be sent from the peripheral control module 132.

When step 410 is true, as is usually the case, in step 414, the peripheral control module 132 loads the next command token, such as CMD52 for a first function "function 1", which may be a read that indicates whether the peripheral device has a packet to upload to the host device 124. In other words, CMD52 read function 1 corresponds to the peripheral control module 132 checking a register of the peripheral device 122. In step 416, the peripheral control module 132 loads the expected response token to CMD52 when the response token arrives from the peripheral device.

In step 418, if the peripheral control module 132 determines that the received response token is correct or what was expected, which is typically the case, then in step 420, the peripheral control module 132 loads the next command token without interrupting the host control module 131. The next command token may be, for example, CMD52 write function 1 to clear an interrupt status register of the peripheral device 122 and/or the peripheral control module 132. The peripheral control module 132 loads the next expected response token, such as an R5 token to CMD52, in step 422, also without interrupting the host control module 131. The peripheral control module 132 may load the next expected response token when the peripheral control module 132 receives the response token that verifies that the interrupt clear is complete.

Otherwise, if the peripheral control module 132 determines that the received response token is incorrect or not what was expected, which is the exception, according the present disclosure, then the peripheral control module 132 interrupts the host control module 131 in step 412. In other words, if the received response token does not correspond to an expected/pre-programmed response token in the response buffer 154, the peripheral control module 132 interrupts the host control module 131. In step 424, if the received token does not correspond to the expected response token, the peripheral control module 132 interrupts the host control module 131 in step 412. Otherwise, as is usually the case, according to the present disclosure, the peripheral control module 132 loads the next command token, such as CMD53, to read the packet header in step 426. In step 428, command/response operations are complete; and the peripheral control module 132 interrupts the host control module 131 in step 412. The host control module 131 may then process the payload data of the packet.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
a processing core configured to generate a request signal to transfer data between a host device and a peripheral device, wherein the processing core is in a low power state subsequent to generating the request signal;
an interface module, separate from the processing core, that is configured to transmit a sequence of commands from the host device to the peripheral device based on the request signal, wherein the sequence of commands is transmitted to initiate the transfer of the data between the host device and the peripheral device; and
a comparator configured to compare expected responses of the peripheral device to the sequence of commands against responses received from the peripheral device to control the transfer of the data between the host device and the peripheral device without waking up the processing core from the low power state.

2. The system of claim 1, wherein:
the processing core is configured to generate the expected responses including determining responses to the commands which are expected to be generated by the peripheral device; and
the processing core generates the expected responses prior to generating the request signal.

3. The system of claim 2, further comprising a memory, wherein the processing core is configured to store the expected responses in the memory.

4. The system of claim 3, further comprising a peripheral control module configured to store the expected responses in the memory and to provide the expected responses and the responses received from the peripheral device to the comparator.

5. The system of claim 3, wherein:
the processing core is configured to store the expected responses as a sequence of responses in the memory; and
the comparator is configured to compare the sequence of responses to the responses received from the peripheral device and to generate an output signal.

6. The system of claim 5, further comprising a buffer configured to enable sending one of the commands to the peripheral device based on the output signal, wherein the buffer is configured to enable the sending of the one of the commands when one of the responses received from the peripheral device matches a corresponding one of the expected responses.

7. The system of claim 5, further comprising an interrupt control module configured to generate an interrupt signal and transmit the interrupt signal to the processing core to wake up the processing core based on the output signal, wherein the interrupt control module is configured to generate the interrupt signal when one of the responses received from the peripheral device does not match a corresponding one of the expected responses.

8. The system of claim 2, wherein:
the processing core is configured to generate an expected response for each of the commands; and
the interface module is configured to receive a respective one of the responses received from the peripheral device in response to transmitting each one of the commands to the peripheral device.

9. The system of claim 1, wherein the interface module is configured to transmit the sequence of commands to the peripheral device during packet header communication with the peripheral device.

10. The system of claim 1, further comprising:
a peripheral control module comprising the comparator; and
a first direct memory access control module configured to control transfers of the commands and the expected responses from a memory to the peripheral control module.

11. The system of claim 10, wherein:
the peripheral control module comprises a second direct memory access control module configured to provide payload data;
the payload data is associated with packets exchanged between the peripheral device and the interface module; and
the peripheral control module is configured to control the exchange of the packets between the peripheral device and the interface module based on the commands.

12. The system of claim 1, further comprising the peripheral device, wherein the peripheral device comprises at least one of a secure digital card, a secure digital input and output card, and a multi-media control card.

13. A method comprising:
generating a request signal via a processing core to transfer data between a host device and a peripheral device, wherein the processing core is in a low power state subsequent to generating the request signal;
transmitting a sequence of commands from the host device to the peripheral device via an interface module that is separate from the processing core, wherein the sequence of commands is transmitted responsively to the request signal, and wherein the sequence of commands is transmitted to initiate the transfer of the data between the host device and the peripheral device; and
comparing expected responses of the peripheral device to the sequence of commands against responses received from the peripheral device to control the transfer of the data between the host device and the peripheral device without waking up the processing core from the low power state.

14. The method of claim 13, further comprising:
generating the expected responses including determining responses to the commands which are expected to be generated by the peripheral device; and
generating the expected responses prior to generating the request signal.

15. The method of claim 14, further comprising storing the expected responses in a memory.

16. The method of claim 15, further comprising:
storing the expected responses in the memory via a peripheral control module; and
providing the expected responses and the responses received from the peripheral device to the comparator.

17. The method of claim 15, further comprising:
storing the expected responses as a sequence of responses in the memory; and
comparing the sequence of responses to the responses received from the peripheral device to generate an output signal.

18. The method of claim 17, further comprising enabling sending one of the commands to the peripheral device based on the output signal, wherein the sending of the one of the commands is enabled when one of the responses received from the peripheral device matches a corresponding one of the expected responses.

19. The method of claim 17, further comprising generating an interrupt signal and transmitting the interrupt signal to the processing core to wake up the processing core based on the output signal, wherein the interrupt signal is generated when one of the responses received from the peripheral device does not match a corresponding one of the expected responses.

20. The method of claim 14, further comprising:
generating an expected response for each of the commands; and
receiving a respective one of the responses received from the peripheral device in response to transmitting each one of the commands to the peripheral device.

* * * * *